(12) United States Patent
Chang et al.

(10) Patent No.: US 6,485,198 B1
(45) Date of Patent: Nov. 26, 2002

(54) OPTOELECTRONIC TRANSCEIVER HAVING INTEGRATED OPTICAL AND ELECTRONIC COMPONENTS

(75) Inventors: Chung-Tao Chang, Hsinchu (TW); Bi-Chu Wu, Hsin-Chu (TW); Chien Chen, Hsinchu (TW); Chih-Hsiang Ko, Tainan (TW)

(73) Assignee: Industrial Technology Research Institute, Hsin Chu (TW)

( * ) Notice: Subject to any disclaimer, the term of this patent is extended or adjusted under 35 U.S.C. 154(b) by 0 days.

(21) Appl. No.: 10/021,912

(22) Filed: Dec. 12, 2001

(51) Int. Cl.[7] .................................................. G02B 6/36
(52) U.S. Cl. ........................................................ 385/92
(58) Field of Search ........................... 385/88–95, 147, 385/135, 134, 130, 139; 250/370.14, 435; 710/1; 359/133, 161, 154

(56) References Cited

U.S. PATENT DOCUMENTS

| | | | |
|---|---|---|---|
| 5,125,054 A | * | 6/1992 | Ackley et al. ............... 385/130 |
| 5,191,459 A | * | 3/1993 | Thompson et al. ......... 359/133 |
| 5,283,851 A | * | 2/1994 | Vergnolle ................... 385/134 |
| 5,379,141 A | * | 1/1995 | Thompson et al. ......... 359/125 |
| 5,500,758 A | * | 3/1996 | Thompson et al. ......... 359/133 |
| 5,930,428 A | * | 7/1999 | Irwin et al. .................... 385/88 |
| 6,014,713 A | * | 1/2000 | Agnew et al. ................. 385/90 |
| 6,157,035 A | * | 12/2000 | Kuijk et al. ............ 250/370.01 |
| 6,164,837 A | * | 12/2000 | Haake et al. .................. 385/88 |

* cited by examiner

Primary Examiner—Akm E. Ullah
(74) Attorney, Agent, or Firm—Tung & Associates

(57) ABSTRACT

An optoelectronic transceiver that has integrated optical and electronic components, and can be passively aligned by a flip-chip method and a mechanical method is provided. The optoelectronic transceiver can be constructed by the key components of a circuit board, a silicon sub-mount, at least two IC chips formed on a silicon sub-mount, a microlens array, an optical fiber, and a receptacle for housing the silicon sub-mount, the at least two IC chips, the microlens array and the optical fiber connector in an aligned configuration. The at least two IC chips preferably include a laser diode, a laser diode driver, a photodetector and a photodetector amplifier. The mechanical alignment between a microlens array and a silicon sub-mount is performed by indentations provided in the surfaces of the two parts and the placement of spacer balls in the indentations.

16 Claims, 4 Drawing Sheets

OPTOELECTRONIC TRANSCEIVER HAVING INTEGRATED OPTICAL AND ELECTRONIC COMPONENTS

FIELD OF THE INVENTION

The present invention generally relates to an optoelectronic transceiver and more particularly, relates to an optoelectronic transceiver that can be passively aligned by a flip-chip method wherein transceiver has integrated optical and electronic components.

BACKGROUND OF THE INVENTION

The use of optoelectronic technology such as those related to optical data storage and retrieval for computer applications has been growing rapidly in recent years. For instance, it is used in a typical optical data storage device, such as a compact disk. It has also found many other uses in consumer-oriented products, including home entertainment systems, multi-media systems, CD ROM for computer memories and other sophisticated computer devices. Optical disk memories have also emerged as an important and reliable form of information storage for computer systems in general. An optoelectronic transceiver is a key component within such systems.

An optoelectronic transceiver typically includes a laser diode and a photo diode that are used to transmit light in a manner that allows the information from an optical disk to be retrieved. The optoelectronic transceiver typically includes an array of microlenses and a compact optical system that collect and process light that originates from a laser diode that is reflected from the disk surface. A set of photodetectors are utilized to convert reflected light into electronic signals in order to gather the information that is stored on the optical disk. Photodetectors are also used to ensure that the light emitted from the laser diode is focused and tracked properly.

To allow an optoelectronic transceiver to function properly in an optoelectronic system, the geometric and alignment requirements of the system must be met. The geometric requirements, which include the packaging of the various components in a small, compact package such that the size of the optoelectronic device can be reduced. The alignment requirements inbetween the optical source, the microlens and the laser diode is also critical such that the optical signals can be fully converted to electronic signals without the possibility of inaccurate processing of information from the optical disk.

It is therefore an object of the present invention to provide an optoelectronic transceiver that does not have the drawbacks or shortcomings of the conventional optoelectronic transceivers.

It is another object of the present invention to provide an optoelectronic transceiver that has integrated optical and electronic components that form a compact package.

It is a further object of the present invention to provide an optoelectronic transceiver wherein the optical source, the microlens and the laser diode are passively aligned by a flip-chip method.

It is another further object of the present invention to provide an optoelectronic transceiver that has integrated optical and electronic components assembled on a circuit board and in a receptacle.

It is still another object of the present invention to provide an optoelectronic transceiver that utilizes a plurality of wirebonds electrically connecting a silicon sub-mount to a circuit board, and at least two IC chips to the silicon sub-mount.

It is yet another object of the present invention to provide an optoelectronic transceiver that utilizes solder bumps by a self-aligned flip-chip method for connecting electrically of at least two IC chips to a silicon sub-mount.

It is still another further object of the present invention to provide an optoelectronic transceiver wherein self alignment between a silicon sub-mount and a microlens array is achieved by using mechanical means of spacer balls and indentations provided in the surfaces of the silicon sub-mount and the microlens array.

SUMMARY OF THE INVENTION

In accordance with the present invention, an optoelectronic transceiver that has integrated optical and electronic components, and is passively aligned by a flip-chip solder bump method is provided.

In a preferred embodiment, an optoelectronic transceiver that has integrated optical and electronic components is provided which includes a circuit board that is formed in an "L" shape with a vertical portion and a horizontal portion. The vertical portion has an exterior planar surface for receiving a silicon sub-mount. The horizontal portion has a bottom surface provided with a plurality of conductive leads; a silicon sub-mount for mounting to the exterior planar surface of the vertical portion of the circuit board; at least two IC chips of a laser diode and a photodetector formed on a top surface of the silicon sub-mount; an array of microlenses positioned juxtaposed and parallel to the silicon sub-mount aligned with the laser diode; an optical fiber for inputting or outputting an optical signal through an optical fiber connector; and a receptacle for housing the silicon sub-mount, the at least two IC chips, the array of microlenses and the optical fiber connector in an aligned configuration.

The optoelectronic transceiver that has integrated optical and electronic components may further include a heat spreader positioned on a top surface of the horizontal portion of the circuit board. The transceiver may further include a plurality of wirebonds electrically connecting the silicon sub-mount to the circuit board, and electrically connecting the at least two IC chips to the silicon sub-mount. The at least two IC chips may further include solder bumps for providing electrical communication with the silicon sub-mount. The at least two IC chips may be self-aligned with the silicon sub-mount by a plurality of solder bumps. The optoelectronic transceiver may further include at least four indentations formed in a top surface of the silicon sub-mount and in a bottom surface of the array of microlenses in such a way that the indentations are mirror imaged to each other when the silicon sub-mount and the array of microlenses are in an assembled position, and at least four spacer balls positioned in-between the at least four indentations to self-align the silicon sub-mount to the array of microlenses.

In the optoelectronic transceiver, the circuit board may be formed of an insulating material. The at least two IC chips may be four IC chips that includes a laser diode, a photodetector, a laser diode driver and a photodetector amplifier. The at least two IC chips may further include wirebonds for providing electrical communication with the silicon sub-mount. The optoelectronic transceiver may further include at least two spacer bars positioned between the array of microlenses and the silicon sub-mount for keeping a predetermined spacing between the array of microlenses and the at least two IC chips. The plurality of conductive leads on the bottom surface of the horizontal portion of the circuit board may be a plurality of solder bumps.

In the optoelectronic transceiver, the receptacle may be formed of a top plate, a bottom plate, a mounting column on each of the top and bottom plates and an aperture at a center of each of the mounting columns for receiving a pair of guide pins when the optoelectronic transceiver is in an assembled position. The vertical portion of the circuit board may further include a pair of apertures at near a top and a bottom edge of the vertical portion for receiving a pair of guide pins. The pair of guide pins may engage a pair of apertures in the vertical portion of the circuit board at one end, while engaging a pair of apertures in the mounting columns at the other end. The optical fiber may include a bundle of optical fibers. The silicon sub-mount, the at least two IC chips and the array of microlenses are positioned parallel to each other when they are mounted in the receptacle. The laser diode may be one that generates pulsed laser.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

An optoelectronic transceiver that has integrated optical and electronic components, and is passively aligned by a flip-chip method and a mechanical alignment method is disclosed.

The optoelectronic transceiver of the present invention can be constructed by a circuit board, a silicon sub-mount, at least two IC chips, an array of microlenses, optical fibers, and a receptacle.

The circuit board can be advantageously formed in an "L" shape that has a vertical portion and a horizontal portion. The vertical portion may have an exterior planar surface for receiving a silicon sub-mount. The horizontal portion may have a bottom surface equipped with a plurality of conductive leads, and a top surface equipped with a heat spreader. A silicon sub-mount is mounted to the exterior, planar surface of the vertical portion of the circuit board with at least two IC chips of a laser diode and a photodetector formed therein. More advantageously, at least four IC chips of a laser diode, a laser diode driver, a photodetector, and a photodetector amplifier are formed on a top surface of the silicon sub-mount.

A microlens array is positioned juxtaposed and parallel to the silicon sub-mount aligned with the laser diode by a mechanical alignment method utilizing spacer balls. An optical fiber, or an optical fiber bundle is used for inputting and outputting an optical signal through an optical fiber connector that is mounted inside a receptacle. The receptacle further houses the silicon sub-mount, the at least two IC chips, the microlens array in an aligned configuration.

Figure 1:
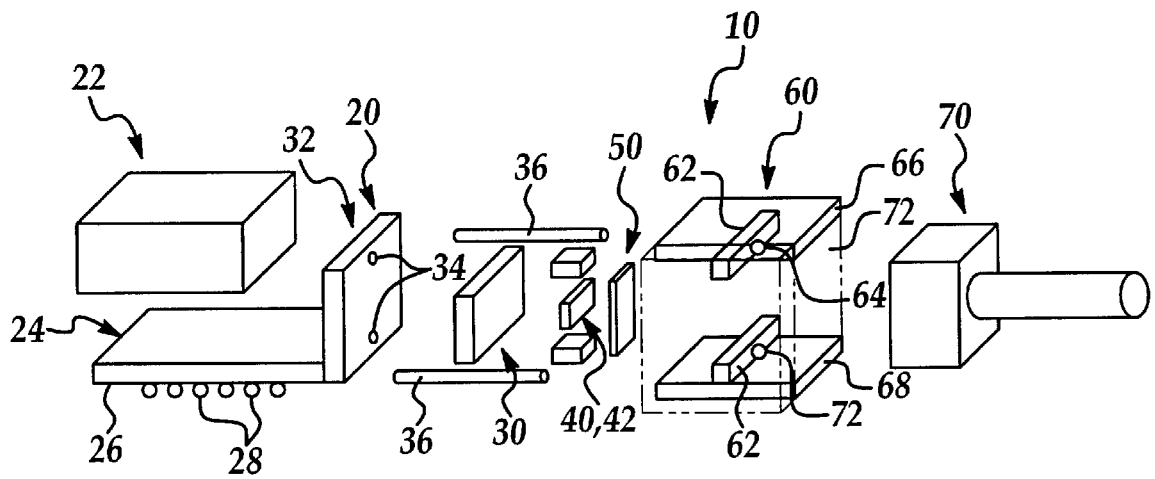
FIG. 1 is a perspective view of the various key components for the optoelectronic transceiver.

Referring initially to FIG. 1 wherein a perspective view of the various key components of the present invention optoelectronic transceiver 10 is shown. The optoelectronic transceiver 10 is constructed by a circuit board 20, a silicon sub-mount 30, at least two IC chips such as a laser diode 40 and a photodetector 42, a microlens array 50, a receptacle 60 and an optical fiber connector 70. A heat spreader 22 may optionally be mounted on top of a horizontal portion 24 of the circuit board 20. On a bottom surface 26 of the horizontal portion 24, a plurality of conductive leads 28 such as solder bumps is further provided for electrical communication with an outside circuit. The circuit board 20 further includes metal traces (not shown) formed inside the substrate for providing electrical communication with the vertical portion 32 of the circuit board 20, and furthermore, with the silicon sub-mount 30 by wirebonds 34 (shown in FIG. 3).

Figure 4:
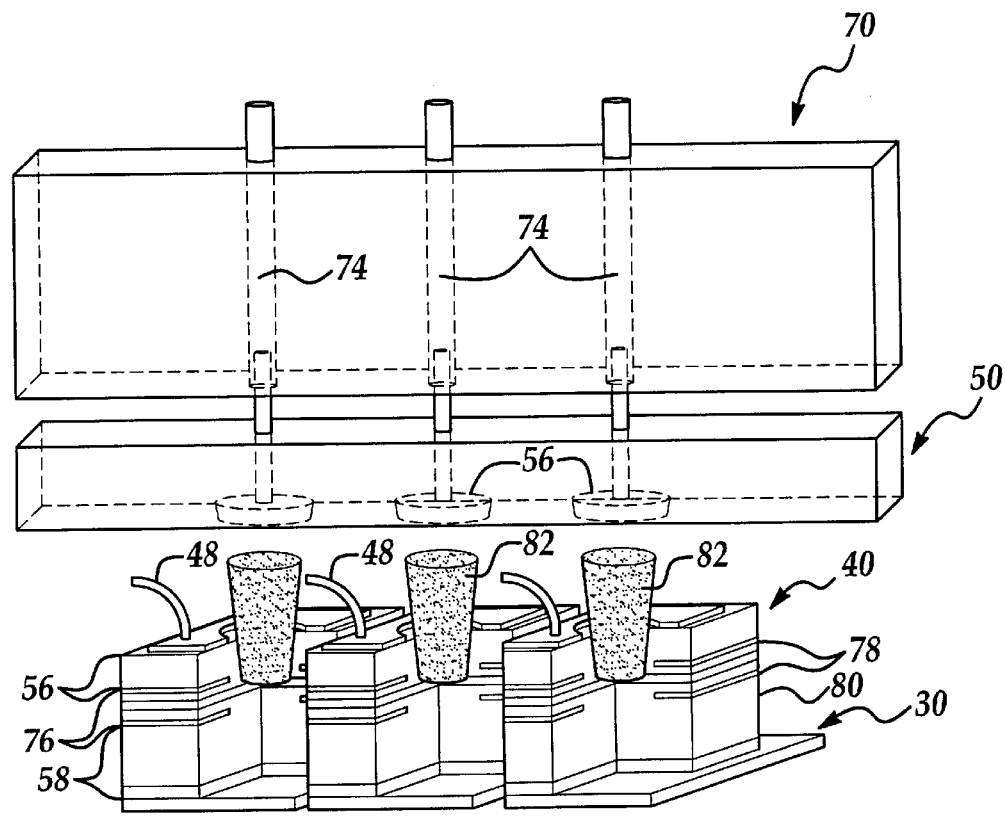
FIG. 4 is the perspective view illustrating the laser diode, the microlens array and the optical fiber connector of the present invention optoelectronic transceiver.

Further shown in FIG. 4 are the microlens array 50, the receptacle 60 equipped with a pair of mounting columns 62 each provided with a center aperture 64, and the optical fiber connector 70. The receptacle 60 is further constructed by a top plate 66, a bottom plate 68 and two side plates 72.

The vertical portion 32 of the circuit board 20 is further provided, at near a top edge and a bottom edge, a pair of apertures 34 for engaging a pair of guide pins 36, while the other end of the guide pins 36 engages the pair of apertures 64 in the support column 62 for the receptacle 60.

Figure 5:
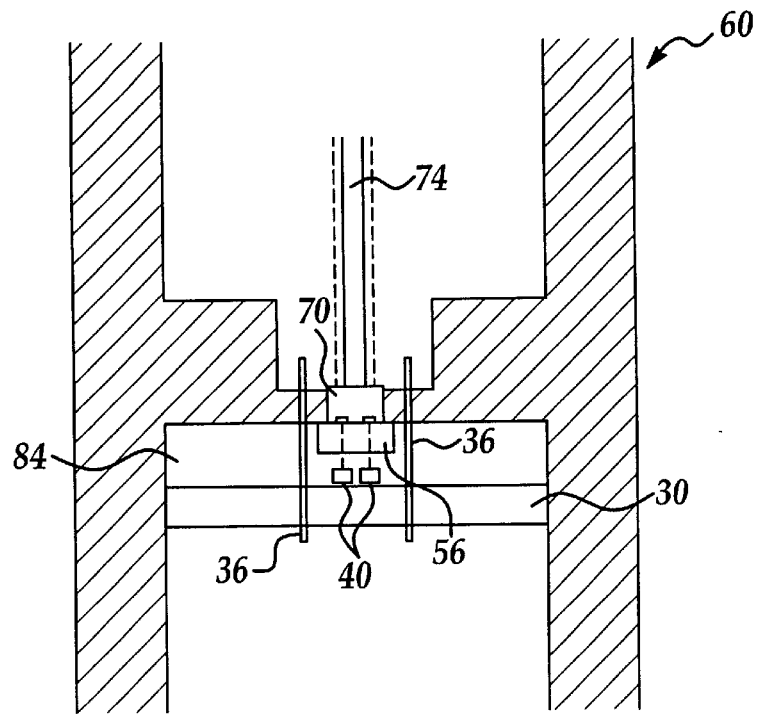
FIG. 5 is an enlarged, cross-section view of the present invention optical fiber, receptacle, microlens array, laser diode and the silicon sub-mount.
Figure 6:
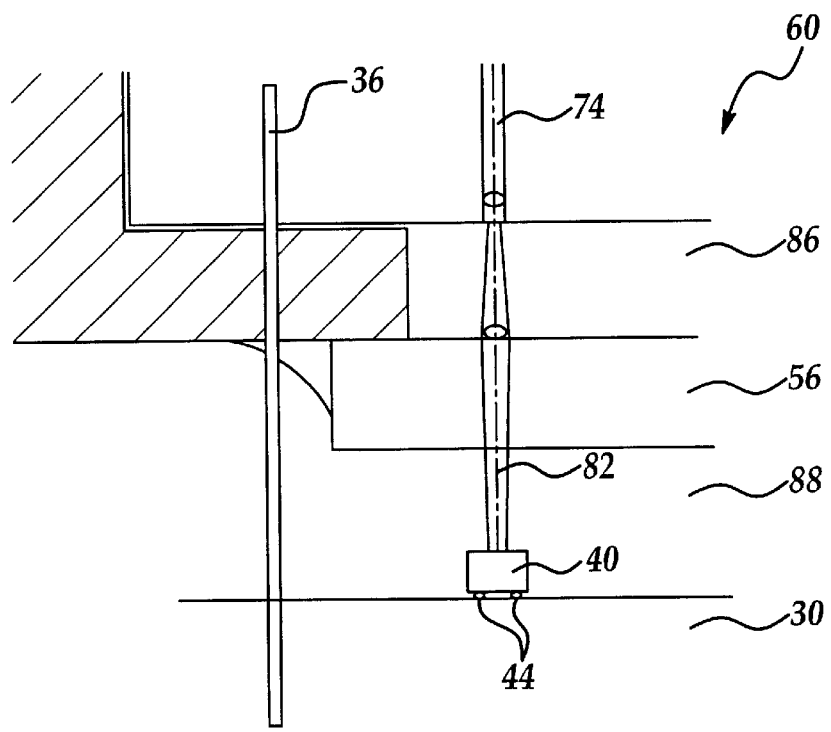
FIG. 6 is a further enlarged cross-sectional view of the present invention device shown in FIG. 5.

An enlarged, cross-section view of the receptacle 60 with the optical fiber connector 70, the pair of guide pins 36, the microlens array 50, the pair of spacer bars 52, the at least two IC chips 40, 42 and the silicon sub-mount 30 mounted therein shown in FIGS. 5 and 6. The receptacle 60 is attached to the vertical portion 32 of the circuit board 20 by the pair of guide pins 36, and by wirebond 34 (shown in FIG. 3). A plurality of solder bumps is further used to electrically connect the at least two IC chips 40, 42 with the silicon sub-mount 30.

Figure 2:
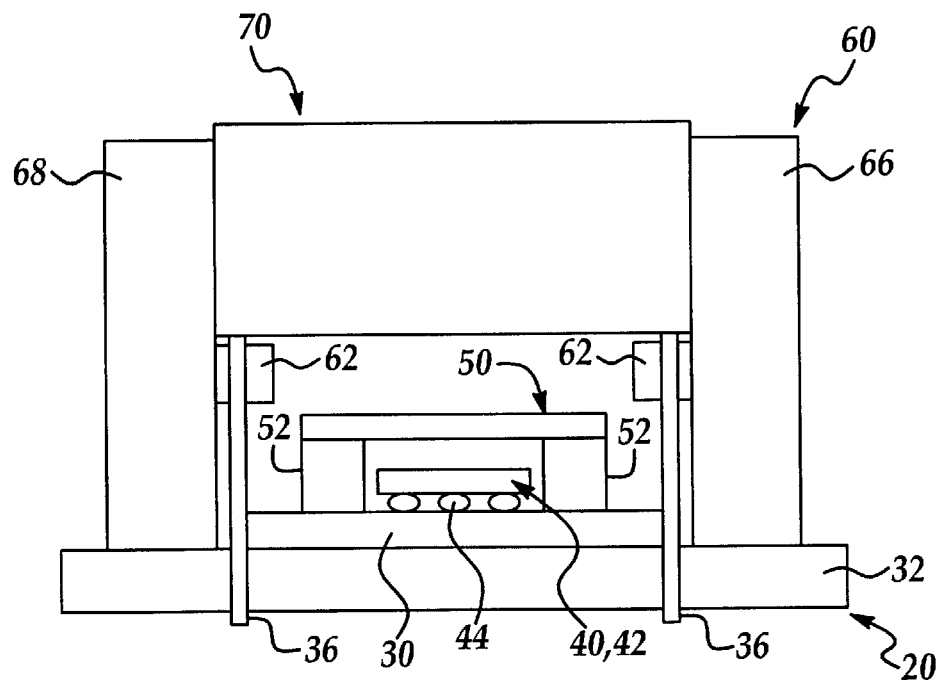
FIG. 2 is a cross-sectional view of the key components of the present invention optoelectronic transceiver assembled in the receptacle.
Figure 3:
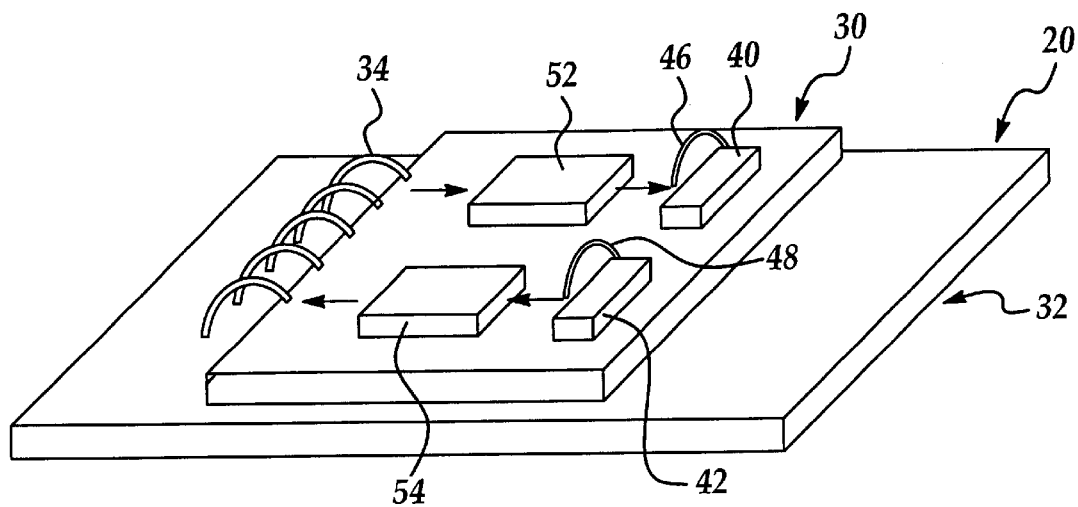
FIG. 3 is a perspective view of the at least two IC chips, the silicon sub-mount and the circuit board.

FIG. 3 is a perspective view of the at least two IC Chips 40, 42, the silicon sub-mount 30 and the circuit board 20. It is shown that the at least two IC chips 40, 42 include a laser diode 40 that is connected to the silicon sub-mount 30 by wirebond 46, and a photodetector 42 that is connected to the silicon sub-mount 30 by wirebond 48. Two other IC chips of a laser diode driver 52 and a photodetector amplifier 54 are further utilized for driving the laser diode 40 and for amplifying the photodetector 42. These IC chips, 40, 42, 52 and 54 are electrically connected to the silicon sub-mount 30 by a plurality of solder bumps 44 (shown in FIG. 2). Electrical connections between the silicon sub-mount 30 and the circuit board 20 are provided by wirebonds 34. It should be noted that the IC chips 40, 42, 52 and 54 shown in FIG. 3 are for illustration purposes only. Any other suitable combinations of IC chips may be used in the present invention optoelectronic transceiver.

A perspective view of the present invention optical fiber connector 70, the microlens array 50, the laser diode 40 and the silicon sub-mount 30 is shown in FIG. 4. The optical fiber connector is provided to guide a plurality of optical fibers 74 to let the light from laser diode 40 be projected into microlens 56 such that it can be collected by optical fibers 74. The laser diode 40 is constructed by a bonding wire 48, a top mirror section 56, a bottom mirror section 58 and a center laser cavity 76. The center laser cavity 76 is sandwiched in-between two oxide layers 78 with a gain region 80 at the center of the laser cavity 76. As shown in FIG. 4, optical emissions 82 were generated by the laser diode 40.

An enlarged, cross-sectional view of the present invention receptacle 60 with the various components installed therein is shown in FIGS. 5 and 6. The cavity 84 formed inbetween the silicon sub-mount 30 and the receptacle housing 60 may be filled with an inert gas such as nitrogen. In a further enlarged, cross-sectional view shown in FIG. 6, the pattern of the optical emissions 82 through the air gap 86, the microlens 56, the nitrogen environment 88 before entering the laser diode 40 is further shown. It should be noted that the self-alignment feature of the present invention between the laser diode 40 and the silicon sub-mount 30 is achieved by the solder bumps 44 provided on laser diode 40 with the bond pads (not shown) on the silicon sub-mount which are coated with an under-bump-metallurgy (UBM) layer (not shown).

Figure 7:
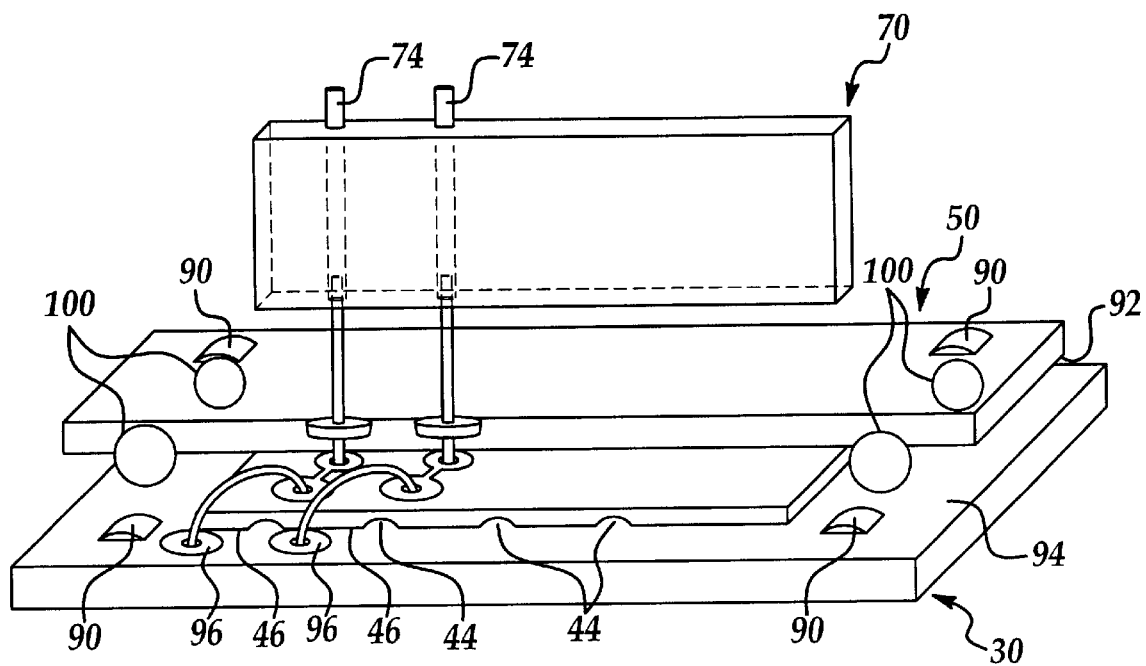
FIG. 7 perspective view of the optical fiber connector, the microlens array, the laser diode and the silicon sub-mount of the present invention optoelectronic transceiver.
Figure 7A:
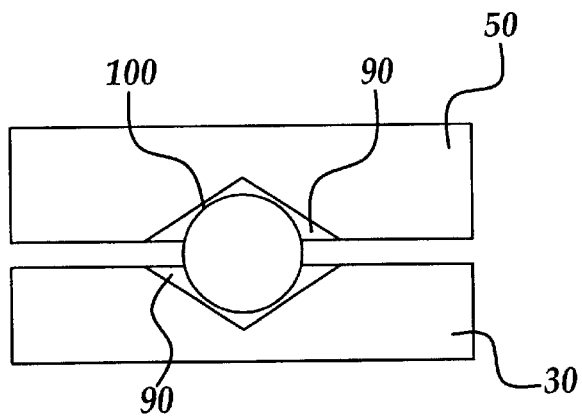
FIG. 7A is an enlarged cross-sectional view of the present invention mechanical alignment system between the microlens method and the silicon sub-mount.

A second self-alignment feature by mechanical means made possible by the present invention novel structure is shown in FIGS. 7 and 7A in a perspective view of the optical fiber connector 70, the microlens array 50, the laser diode 40 and the silicon sub-mount 30. It is seen that at least four and preferably more, indentations 90, or grooves are provided on a bottom surface 92 of the microlens array 50, and on a top surface 94 of the silicon sub-mount 30. The indentations 90 are provided such that they are mirror imaged to each other when the microlens array 50 and the silicon sub-mount 30 are positioned together in an assembled condition with the laser diode 40 positioned therein between. At least four spacer balls 100 of a predetermined diameter are utilized in-between the indentations 90 for providing the self-alignment function between the microlens array 50 and the silicon sub-mount 30 as shown in an enlarged, cross-sectional view of FIG. 7A. It should be noted that the solder bumps 44 and the laser diode 40 which performs the self-alignment function with the silicon sub-mount 30 are also shown in FIG. 7, so are the wirebonds 46 that make electrical communication between the laser diode 40 and bond pads 96 on the silicon sub-mount 30.

The present invention novel optoelectronic transceiver that has integrated optical and electronic components, and is passively aligned by a flip-chip method and a mechanical method has therefore been amply described in the above descriptions and in the appended drawings of FIGS. 1–7A.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows.

What is claimed is:

1. An optoelectronic transceiver having integrated optical and electronic components comprising:
    a circuit board formed in "L" shape having a vertical portion and a horizontal portion, said vertical portion having an exterior planar surface for receiving a silicon sub-mount, said horizontal portion having a bottom surface equipped with a plurality of conductive leads;
    a silicon sub-mount for mounting to said exterior planar surface of said vertical portion of the circuit board;
    at least two IC chips of a laser diode and a photodetector formed on a top surface of said silicon sub-mount;
    an array of microlenses positioned juxtaposed and parallel to said silicon sub-mount aligned with said laser diode;
    an optical fiber for inputting or outputting an optical signal through an optical fiber connector; and
    a receptacle for housing said silicon sub-mount, said at least two IC chips, said array of microlenses and said optical fiber connector in an aligned configuration.

2. An optoelectronic transceiver having integrated optical and electronic components according to claim 1 further comprising a heat spreader, positioned on a top surface of said horizontal portion of the circuit board, for dissipating heat from said silicon sub-mount and supporting the "L" structure of said circuit board.

3. An optoelectronic transceiver having integrated optical and electronic components according to claim 1 further comprising a plurality of wirebonds electrically connecting said silicon sub-mount to said circuit board.

4. An optoelectronic transceiver having integrated optical and electronic components according to claim 1 further comprising a plurality of wirebonds electrically connecting said at least two IC chips to said silicon sub-mount.

5. An optoelectronic transceiver having integrated optical and electronic components according to claim 1, wherein said at least two IC chips further comprise solder bumps for providing electrical communication with said silicon sub-mount.

6. An optoelectronic transceiver having integrated optical and electronic components according to claim 1, wherein said at lest two IC chips are self-aligned with said silicon sub-mount by a plurality of solder bumps.

7. An optoelectronic transceiver having integrated optical and electronic components according to claim 1, further comprising:
    at least four indentations formed in a top surface of said silicon sub-mount and in a bottom surface of said array of microlenses in such a way that the indentations are mirror imaged to each other when the silicon sub-mount and the array of microlenses are in an assembled position, and
    at least four spacer balls positioned in between said at least four indentations to self-align said silicon sub-mount to said array of microlenses.

8. An optoelectronic transceiver having integrated optical and electronic components according to claim 1, wherein said at least two IC chips include IC functions comprising a laser diode, a photodetector, a laser diode driver and a photodetector amplifier.

9. An optoelectronic transceiver having integrated optical and electronic components according to claim 1, wherein said at least two IC chips further comprises wirebonds for providing electrical communication with said silicon sub-mount.

10. An optoelectronic transceiver having integrated optical and electronic components according to claim 1, further comprising at least two spacer bars positioned in between said array of microlenses and said silicon sub-mount for keeping a predetermined spacing between said array of microlenses and said at least two IC chips.

11. An optoelectronic transceiver having integrated optical and electronic components according to claim 1, wherein said plurality of conductive leads on said bottom surface of the horizontal portion of the circuit board is a plurality of solder balls.

12. An optoelectronic transceiver having integrated optical and electronic components according to claim 1, wherein said receptacle is formed of a top plate, a bottom plate, a mounting column on each of said top and bottom plates, and an aperture at a center of each of said mounting columns for receiving a pair of guide pins when said optoelectronic transceiver is in an assembled condition.

13. An optoelectronic transceiver having integrated optical and electronic components according to claim 1, wherein said vertical portion of the circuit board further comprises a pair of apertures at near a top and a bottom edge of the vertical portion for receiving a pair of guide pins.

14. An optoelectronic transceiver having integrated optical and electronic components according to claim 12, further comprising a pair of guide pins for engaging a pair of apertures in said vertical portion of the circuit board at one end, and a pair of apertures in said mounting columns at the other end.

15. An optoelectronic transceiver having integrated optical and electronic components according to claim 1, wherein said optical fiber comprises a bundle of optical fibers.

16. An optoelectronic transceiver having integrated optical and electronic components according to claim 1, wherein said silicon sub-mount, said at least two IC chips and said array of microlenses are parallel to each other when they are mounted in said receptacle.

* * * * *